(12) United States Patent
Kuleshova

(10) Patent No.: US 11,842,370 B2
(45) Date of Patent: Dec. 12, 2023

(54) USER WEARABLE DEVICE FOR VIDEO INFORMATION AND ADVERTISING MATERIAL DEMONSTRATION AND NETWORK SYSTEM FOR INFORMATION MATERIAL DISTRIBUTION TO DEMONSTRATION DEVICE CARRIERS OF THIS MATERIAL

(71) Applicant: Alexandra Mikhailovna Kuleshova, Moscow (RU)

(72) Inventor: Alexandra Mikhailovna Kuleshova, Moscow (RU)

( * ) Notice: Subject to any disclaimer, the term of this patent is extended or adjusted under 35 U.S.C. 154(b) by 0 days.

(21) Appl. No.: 17/777,312

(22) PCT Filed: Jun. 4, 2020

(86) PCT No.: PCT/RU2020/000268
§ 371 (c)(1),
(2) Date: May 17, 2022

(87) PCT Pub. No.: WO2021/158139
PCT Pub. Date: Aug. 12, 2021

(65) Prior Publication Data
US 2022/0405804 A1     Dec. 22, 2022

(30) Foreign Application Priority Data

Feb. 5, 2020   (RU) .......................... RU2020105247
Mar. 17, 2020  (RU) .......................... RU2020110996

(51) Int. Cl.
*G06Q 30/00*      (2023.01)
*G06Q 30/0251*    (2023.01)
(Continued)

(52) U.S. Cl.
CPC ..... *G06Q 30/0267* (2013.01); *G06Q 30/0273* (2013.01); *G09F 9/335* (2021.05);
(Continued)

(58) Field of Classification Search
CPC ................ G06Q 30/0207–0277; G09F 21/026
See application file for complete search history.

(56) References Cited

U.S. PATENT DOCUMENTS 6,393,745 B1 *  5/2002  Miki ....................... G09F 27/00
                                              224/655
8,626,586 B1 *  1/2014  Biere ................. G06Q 30/0241
                                              725/71
(Continued)

FOREIGN PATENT DOCUMENTS

CN   202009790 U   10/2011
RU   2301449 C2    6/2007
(Continued)

OTHER PUBLICATIONS

Search report in PCT/RU2020/000268, dated Mar. 4, 2021.

*Primary Examiner* — Luis A Brown
(74) *Attorney, Agent, or Firm* — Bardmesser Law Group

(57) ABSTRACT

The invention is related to a sphere of mobile advertisement. The user wearable device for video information and advertising material demonstration represented by a user wearable personal item is equipped with multimedia device comprising the display placed on the front wall of the personal item and electrically connected with the processor unit placed inside the personal item and connected to the power unit. The processor unit is designed as microprocessor board represented by single-chip BLUETOOTH controller with integrated processor functioning as a processor and signal reception unit in the wireless communication mode with a mobile communication device. The display is designed as a flexible film OLED panel placed in the pocket on the font side of the personal item, which can be closed and whose front wall is made of transparent material.

10 Claims, 2 Drawing Sheets

(51) Int. Cl.
*H04W 4/80* (2018.01)
*G09F 9/33* (2006.01)
*G06Q 30/0273* (2023.01)
*G09F 21/02* (2006.01)
*H04W 4/02* (2018.01)

(52) U.S. Cl.
CPC .......... *G09F 21/026* (2013.01); *H04W 4/025* (2013.01); *H04W 4/80* (2018.02)

(56) References Cited

U.S. PATENT DOCUMENTS

| | | | | |
|---|---|---|---|---|
| 9,225,510 | B1* | 12/2015 | Wharton | H04L 67/02 |
| 10,783,559 | B1* | 9/2020 | Tran | G06V 20/597 |
| 2005/0264543 | A1* | 12/2005 | Gorischek | G09F 21/02 |
| | | | | 345/204 |
| 2008/0120156 | A1* | 5/2008 | Nusbaum | G06Q 30/02 |
| | | | | 705/14.46 |
| 2009/0051561 | A1* | 2/2009 | Cadavid | G06Q 30/02 |
| | | | | 725/32 |
| 2012/0140709 | A1* | 6/2012 | Hou | H04W 56/0015 |
| | | | | 370/328 |
| 2013/0059526 | A1* | 3/2013 | Moore | G09F 21/026 |
| | | | | 455/3.06 |
| 2013/0174322 | A1* | 7/2013 | Williams | A42B 1/248 |
| | | | | 2/181 |
| 2013/0318846 | A1* | 12/2013 | Atwood | G09F 21/026 |
| | | | | 40/636 |
| 2014/0108151 | A1* | 4/2014 | Bookstaff | H04M 15/8083 |
| | | | | 705/14.64 |
| 2015/0161669 | A1* | 6/2015 | Raffa | G06Q 30/0269 |
| | | | | 705/14.66 |
| 2015/0210288 | A1* | 7/2015 | Luong | H04L 51/58 |
| | | | | 701/1 |
| 2017/0055656 | A1* | 3/2017 | Mansueto | A45C 5/14 |
| 2017/0103427 | A1* | 4/2017 | Clark | G06Q 30/0273 |
| 2017/0262884 | A1* | 9/2017 | Miller | A41D 1/002 |
| 2018/0033049 | A1* | 2/2018 | Mayfield | G06Q 30/0261 |
| 2018/0047057 | A1* | 2/2018 | Mayfield | G09F 21/026 |
| 2018/0310046 | A1* | 10/2018 | Cullen | H04W 12/06 |
| 2019/0362391 | A1* | 11/2019 | Sadovsky | G06Q 30/0273 |
| 2020/0019364 | A1* | 1/2020 | Pond | G06F 3/14 |
| 2020/0167831 | A1* | 5/2020 | Jin | G09F 21/026 |
| 2020/0387929 | A1* | 12/2020 | Zhu | G06F 16/29 |
| 2022/0150673 | A1* | 5/2022 | Lord | G09G 3/035 |

FOREIGN PATENT DOCUMENTS

| | | |
|---|---|---|
| RU | 146538 U1 | 10/2014 |
| RU | 167868 U1 | 1/2017 |

* cited by examiner

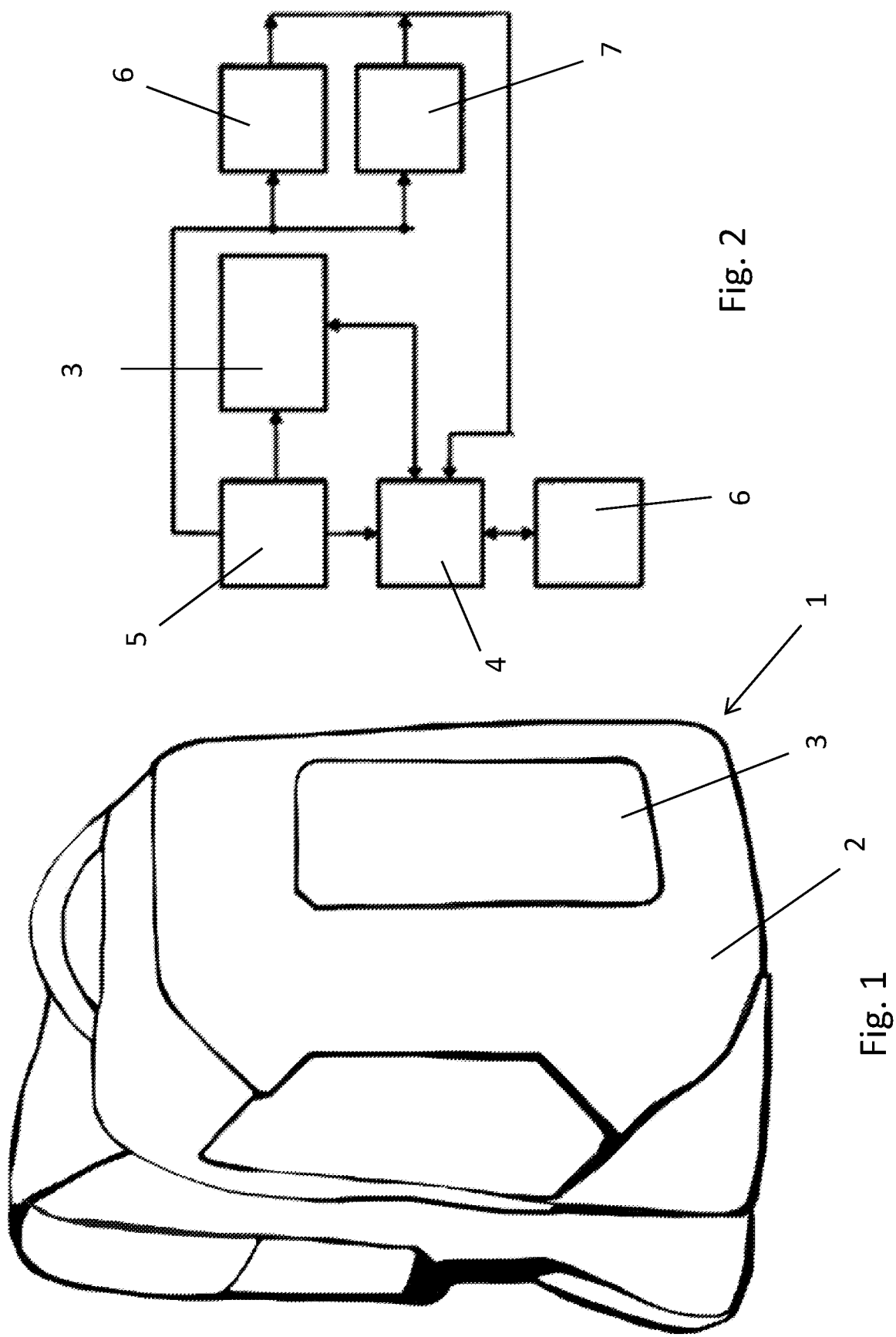

USER WEARABLE DEVICE FOR VIDEO INFORMATION AND ADVERTISING MATERIAL DEMONSTRATION AND NETWORK SYSTEM FOR INFORMATION MATERIAL DISTRIBUTION TO DEMONSTRATION DEVICE CARRIERS OF THIS MATERIAL

CROSS REFERENCE TO RELATED APPLICATIONS

This application is a US National Phase of PCT/RU2020/000268, filed on Jun. 4, 2020, which claims priority to RU 2020105247, filed Feb. 5, 2020 and RU 2020110996, filed Mar. 17, 2020.

FIELD OF THE INVENTION

The invention relates to the field of mobile advertising using personal items, in particular, clothes or bags or backpacks or school rucksacks or suitcases or attaché cases or other user wearable product or item as a carrier of demonstration device of advertising or other information (material).

PRIOR ART

Within the scope of the present invention, term "user wearable" shall mean a personal item, in particular, outer clothing (jacket, coat, suit coat, sweater, cap, etc.) or bag or backpack or suitcase made of soft material. In general this term means items that the user can wear or carry in the hand or on the back or the chest or on the head. Preferably, it is referred to such items that have no stable form or have such space form that may be changed or deformed during wearing or carrying. A soft backpack and jacket may be referred to as an example. When wearing this item, it will continuously change its spatial form. At the same time, there is nothing to limit application of this to on wearable items with a constant rigid form as well (for example, a suitcase or an attaché case or a hat). Within the scope of the application the invention will be considered in respect to the soft backpack as to the specific exemplary embodiment solution.

Currently backpacks (more rarely bags) equipped with display on the outer side turned towards people around the user are very popular. Display on such backpack is connected to modern user wearable computerized cell phone, allowing displaying of an image on the screen. Such backpacks became fashionable due to the fact that the user can set an image on the display reflecting, for example, his/her mood or wish, or just to display an image to cheer the others.

Today there are well-known solutions relating to embodiments of backpack or bag or briefcase or suitcase with display attached on the outer surface. At the same time, either the flatbed displays attached in the special pockets so that the display is oriented outward are used (RU167868) or LED lamps forming a matrix functioning as a display are built into the wearable item wall (UA129885) regardless of the type of wearable item.

As for the electronic circuits, all solutions are basically the same. A pocket or sockets for placement of a battery and a processor unit with BLUETOOTH-receiver ensuring wireless communication between a mobile phone (smartphone, tablet computer, etc.) and a processor unit are provided in the wearable item itself. At the same time, a special application allowing transmission of an image to a processor unit for displaying thereof is installed in a mobile phone (smartphone, tablet computer, etc.). The application allows copying of images from the Internet, creation of personal images, receiving images from the others and dynamic change of image while they are being demonstrated. The patents also reflect that such images may be not only a form of the user's self-expression, but advertising material demonstration at the request of the advertiser as well.

Usage of tabular and rigid thin flatbed displays makes it possible to obtain high image quality in accordance with pixel resolution of the display. And there are more possibilities, because such displays are usually commercially available and have high-quality integrated processor system. But there is a certain disadvantage. Such displays are attached only to rigid bases (side of an attaché case, suitcase, plastic backpack, etc.). It is necessary to exclude bends and deflections of display resulting in breakage. Furthermore, wearable items such as attaché cases, suitcases and plastic backpacks are not very popular among consumers, so their commercial use is limited.

Backpacks and bags with soft walls are now in high demand Taking this features into account, the backpack manufacturer (e.g., PIX, US) provides matrix-like sockets on the soft front wall of a backpack, in which LED lamps connected to a switching device associated with a processor unit (placed inside a backpack) are inserted. Since LED lamps, even small-sized and miniature ones, after all have certain dimensions and equipped with holders (by means of which they are fastened in the matrix sockets), such a matrix will form a display with very spread out LEDs. Hence, there is a screen with a small and very low resolution, allowing provision of large-dimensioned symbolic images only, for example, in the form of emoticons or styled elementary icons. This limits use of such LED displays for display of dynamic images, including advertisement.

A major disadvantage of this structure is that it cannot be washed due to the fact that the front wall is a complex socket structure that needs to be dismantled prior to wash (remove the LED lamps with holders, disconnect the electric connections). Moreover, a backpack does not have sufficient operational reliability due to the fact that its front wall is soft, i.e., it will be deformed in the place of contact and when it is taken off the shoulders. This results in a change of plane configuration of matrix, at which the holders in the sockets became exposed to an up-thrust (due to deformation of sockets). The holders simply jump out of the sockets. The sockets get loose due to continuous deformations also, resulting in lamps falling out. There are attempts to neutralize this disadvantage by increasing wall rigidity, on which the matrix is provided, however, the backpack does not transfer to school rucksacks category as per its structure (school rucksacks as a semi-rigid structure are not popular alone with low interest to hard bags or suitcases).

A solution describing a user wearable device for video information demonstration, represented by the bag carried on the user's arm equipped with multimedia device comprising the display located on the front wall of the personal item electrically connected with the processor unit located inside the personal item connected to the power unit, wherein the processor unit is designed as microprocessor board represented by single-chip BLUETOOTH controller with integrated processor functioning as a processor and signal reception unit in the wireless communication mode with a mobile communication device (RU 167878, A45C15/00, G06F1/00, publ. 25 Dec. 2015).

A disadvantage of this solution is that the bag changes its spatial form given that it is created for carrying different personal items, which determine the outer shape of the bag walls and in this example it is equipped with a flat rigid display fastened on one of the bag sidewalls. Such structure, in the first place, limits the bag volume and, in the second place, there is an increased hazard of display breaking due to pressure from inside the bag. Flat rigid displays used on tablet computers are very sensitive to external load, bends and any deformations and local impacts, which results in breaking the display. Therefore, the wall, to which such display is attached, needs to be flat and rigid. As a result, the bag as a wearable item loses its attractiveness, as it shifts to a category of small handbags (which is in poor demand).

In this regard, wearable items like a bag or backpack have low reliability during operation due to high possibility of display damage. Flat displays in rigid frame are manufactured on the glass base that is quite fragile and can be easily cracked taking into account its shallow thickness.

It should be noted that flat displays in rigid frames have sufficient weight limiting the range of items, on which such display may be placed. For example, it can be impossible to attach such display to the jacket back, whose surface has no flat areas when it is worn on a person.

Currently there are backpack models with flexible LED screens. This flexible screen is a series of hingedly linked linear strips, each of which carries several LEDs. Such a screen may be bent along the hinges. However, due to the fact that the LEDs are spaced apart, it is impossible to obtain dynamically solid and bright proper graphics because of very low resolution. In order to ensure more or less clear and complete image (not in the form of emoticon or sign) it is necessary to increase the screen area, and placement of such screens in the user wearable items is rarely allowable.

So, there is a system for distribution of information material to demonstration device carriers of this material based on usage of the user wearable device for video information and advertising material demonstration represented by the user wearable business bag with handles for documents (or bag with handles for computer or traveling bag or suitcase like attaché case, etc.) considered as advertising presentation case with integrated multimedia device comprising a display placed on the front wall of the personal item and electrically connected with the processor unit placed inside the personal item and connected with the power unit. This bag is designed in the form of advertising presentation case equipped with charging port and computer port, supports editing through computer port allowing information changing and content displaying at any time and in any place.

The advertising presentation case is powered from the integrated rechargeable lithium battery or environmentally safe resources, such as solar power. The screen of the LED advertising display is equipped with a switch for turning on and off control and has functions of speed and brightness regulation and different changeable patterns so that the screen of LED advertising display allows the case functioning as a new means for advertising media and reduces advertising and comprehensive business expenditure. Clients can transmit symbols and graphics of company name, contact number, corporate culture principles on the LED display screen (CN202664630, A45C3/00, A45F3/00, G09F23/00, publ. 16 Jan. 2013).

A disadvantage of this solution is that a change of an image on the display may be performed only after connection of processor unit of multimedia device to a desktop computer. As a rule, the person who had received an advertising case with installed advertising image (and this is the advertising information from the company that presented this case and interested in that this advertising information stays on the case) is unlikely to change the image in order to advertise something else for their own interests. The maximum that can be obtained by means of such advertisement is that the person wearing such advertising case will constantly wear it in public places. Such an advertisement is a passive one and, as a rule, does not reach the broad masses.

The known solution includes possibilities of advertising materials change, but lacks a motivation for this in relation to the person using such a case as a business bag for papers.

The job of any advertising action is to familiarize as many people as possible with the information. It is desirable that this information is presented to these people not on a one-time basis, but multiple times (for fixing the association in a person's mind regarding the advertised item's features). It can be done only by two methods. The first one is that the same people pass billboard multiple times, and at the same time pay attention on it. It can be understood that such method is not effective enough, since it requires attention from the person passing by. The person passing by the billboard is usually focused on his own problems related to his/her getting to the required route point at the moment. Therefore, this person is self-absorbed, and not paying any attention to the outside world.

The second method is that the advertising information itself in any physical appearance moves among the large group of people, for example, when walking. This type of advertisement provision is more efficient as it is mobile (not stationary), is a traffic participant among the moving people and, thus, is an object, to which the attention is paid (even if for a short period of time and unwittingly). The purpose of any advertising action is a formation of image of the offered goods or services in the person's mind, as a future buyer or client, accompanied, most commonly, with elements of symbolic support (e.g., a specific phrase or color combination or memorable image). When repeated multiple times, this symbolic image and associated product are fixed in the person's mind.

But to achieve such success, the advertising material should constantly flash before the person's eyes in any conditions. It is almost impossible to do this using the currently known means and techniques of demonstration of advertising material or other video material. The existing demonstration devices of advertising material are developed based on the condition that the person is in the location area of such a device. As a result, this material is seen by a limited number of people. Lack of the known means and techniques implies that the advertising material is limited by the area of it possible demonstration.

SUMMARY

This invention is aimed at achieving technical result involving increase of operational reliability during demonstration of full dynamic video/color graphics on the surfaces of personal items without stable space form, to increase demonstration efficiency of advertising or any other material by the fact that the people themselves, for whom this material is intended, are used as carriers, and by the fact that carriers of this material move in relation to those, for whom this advertising is intended. That is to say, technical result involves enhancement of advertising action by means of provision of it movement in the moving crowd flow.

The technical result for the first object is achieved by the fact that the user wearable device for video information and advertising material demonstration represented by the user wearable personal item is equipped with multimedia device comprising a display placed on the front wall of a personal item and electrically connected to the processor unit placed inside the personal item and connected to the power unit, wherein the processor unit is designed as microprocessor board represented by single-chip BLUETOOTH controller with an integrated processor functioning as a processor, and a signal reception unit in a wireless communication mode with a mobile communication device; the display is a flexible film OLED panel placed in the pocket on the front side of the personal item, which can be closed and whose front wall is made of transparent material.

The technical result for the second object is achieved by the fact that the network system for distribution of information material to demonstration device carriers of this material comprising the user wearable devices for video information and advertising material demonstration, each of which is represented by the user wearable personal item equipped with multimedia device comprising the display placed on the front wall of the personal item and electrically connected with the processor unit together with a power unit placed inside the personal item and configured for connection to external source of video information and advertising material provision, is equipped with a mobile communication device for each user; the wearable device for video information and advertising material demonstration is configured for signal transmission in the wireless communication mode to the processor unit equipped with a signal reception unit and configured for reception of signals from the processing center server for provision of video information and advertising material for demonstration on the display of the user wearable demonstration device, wherein each mobile communication device is equipped with hardware GSM module supporting SIM function, and the processing center server for video information and advertising material provision configured for personal registration of the user of wearable device for video information and advertising material demonstration, telephone number of his/her mobile communication device and current account number of the user, with assignment of a unique identification number for access to the server and connection to the information material traffic through the application in his/her mobile communication device, after specifying demonstration time of the received information material in the mode of continuous movement of the user or in the mode of movement of the user with short-term stops or in the mode of stationary position, and the server is configured to control location of the user and his/her movement by telephone number of his/her mobile communication device and reward transferring to the current account number of the user or the telephone number linked to this account upon expiration of the user-specified demonstration time of the received information material.

These features are essential and related to formation of the combination of essential features sufficient for achievement of the necessary technical result.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 1 shows a general view of the backpack with multimedia device.

FIG. 2 shows a flowchart of multimedia device.

DETAILED DESCRIPTION OF EMBODIMENTS OF THE INVENTION

Figure 3:
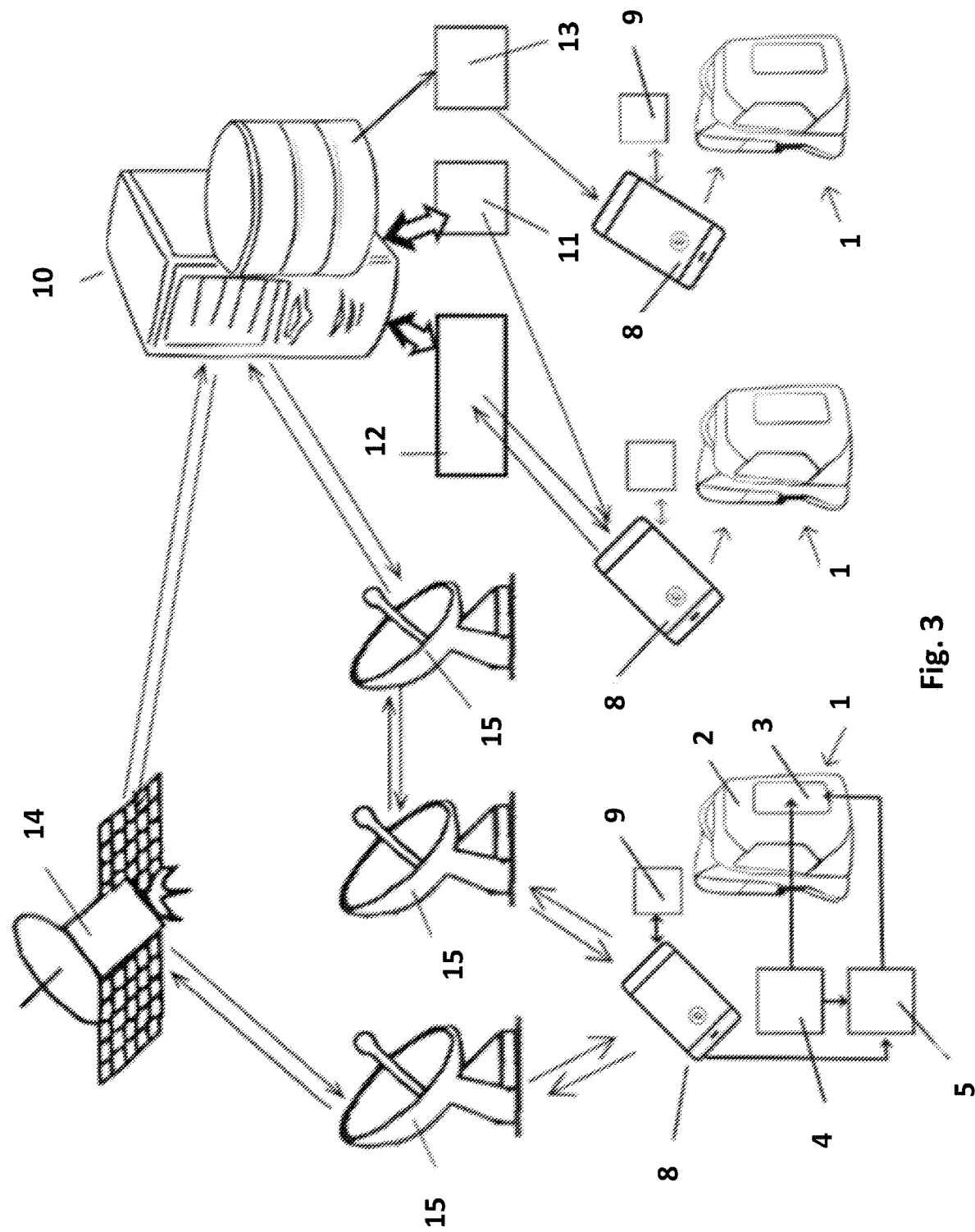
FIG. 3 shows a flowchart of the network system for information material distribution to demonstration device carriers of this material.

Reference will now be made in detail to the preferred embodiments of the present invention, examples of which are illustrated in the accompanying drawings.

The present invention provides a new structure of a user wearable device for video information and advertising material demonstration, allowing their use on the items changing their surface form, such as clothes, bags, backpacks, made of soft deformable materials. In particular, the invention is disclosed in the example of backpack 1 (FIG. 1) made of soft materials, i.e., without rigid framework, at least on the outer surface (not turned towards the user's back). Outer wall 2 (on the front side of the personal item) of backpack 1 comprises a pocket, which can be closed and whose front wall is made of transparent material. Display 3 of multimedia device is inserted or fastened in this pocket, with its main components placed inside the backpack in separate compartments (sections) or a general compartment (section). Display 3 is electrically connected to a processor unit 4 placed inside the personal item and connected to a power unit 5.

The processor unit 4 may be designed as a microprocessor board represented by single-chip BLUETOOTH controller with integrated processor functioning as a processor and signal reception unit in the wireless communication mode with mobile communication device 6 (for example, smartphone or tablet computer or any other portable computerized communication device) that is basically an information input/output device. Microprocessor BLUETOOTH module means, for example, CC2540 BLUETOOTH chip, which is a single-chip BLUETOOTH controller with a built-in processor serving as a processor and signal transmission unit. Or, for example, AT76C551, which is a single-chip controller designed to arrange high-speed short distance data transmission through a radio channel within permitted ISM radio frequency band. The AT76C551 includes a radio frequency processor. This processor performs all processing of digital stream, including modulation and demodulation according to the BLUETOOTH standard. The device controls the transceiver and pre-determined voice codec. The AT76C551 comprises an ARM7TDMI microprocessor core that supports operation with external and internal storage through the microprocessor interface.

The processor unit 4 may be connected with geolocation unit 6 and motion detection unit 7 (for example, in the form of motion sensor designed as electronic infrared sensor of MP559 type, manufactured by ElecFreaks Technology Ltd., China).

A portable lithium-ion battery may be used as a power unit. Multimedia device has the "Start" button for connection of power supply. Processor unit and BLUETOOTH unit may be not joined on one board, but presented in the form of separate units. Flowchart of such multimedia device is given in FIG. 2. Modern element base of electric components allows making these elements with miniature design, wherein their placement on the inner side of the jacket or rear side of the outer wall of the backpack will not create any inconveniences.

The demonstration device is used as follows.

The user puts on, for example, a jacket or a backpack. Connection of power supply to multimedia device is performed by pressing the "Start" button. The device is switched on for file playing, as well as switched off, by touching of sensor screen of a mobile communication device 3 (in the corresponding software) with a finger upon signal transferred to the processor unit via BLUETOOTH from external devices, for example, a mobile phone, laptop, tablet personal computer. Files for playing are sent to the display. Files may be downloaded from any database. When the device is switched off display 3 is not activated.

Due to the fact that multimedia device is closed and protected, the possibility of integrity damage of the components included therein is excluded. Non-contact type of information input/output device, represented by BLUETOOTH, ensures information exchange between the processor unit and external devices on a reliable ubiquitous radio frequency for short-distance communication, i.e., it helps to increase reliability of equipment operation.

A feature of the invention is the fact that the display is designed as flexible film OLED panel placed in the pocket on the front side of the personal item. The flexible display has mechanical and functional features, where it shows not only full high-quality visual information, but is capable of changing its form. Currently there are three technologies of display manufacturing:

LCD is the earliest and by now mostly outdated technology requiring a backlight along the rear plane to ensure screen glow. The OLED operation principle is based on use of light-emitting diodes and encapsulated glass. Top layer is made of polarizer.

AMOLED technology includes organic compounds creating its own light. In this case, background backlight (like in LCD) is not used, allowing sufficiently to simplify the production technology and make the screen more flat.

FAMOLED technology is assumed that the following layers are combined for the screen: bottom layer of TFT, then organic diodes emitting the light, i.e., capable of self-illumination, above which there is a thin encapsulated film of several polyethylene layers replacing the glass, and above which polarizing layer is provided for creation of the specified optical effect.

It is the glass replacement with several layers of polyethylene film that made it possible to bend the screen of smartphone, tablet computer or other equipment, in which this element is used, without abnormal operation. Moreover, such flexible polymeric screens allow formation of full-color dynamic graphics, quality of which does not change in the moments of deformation or wrenching or bending of the polymeric screen. But at the same time, such a screen responds very well to changes of the surface shape, on which it is fastened, i.e., it adapts to the support surface bends with no harm to its functionality. Screen bends under the impact of external load do not result in a breakup thereof.

The display may be designed as an LCD panel with HDMI controller board for flexible OLED displays or as LED film.

For example, Industrial Technology Research Institute (ITRI) in Taiwan created the flexible screens using the technology of organic light-emitting diode (OLED panels) capable of withstanding of up to 10,000 inward bends. Moreover, the panel can demonstrate full color range (resolution of 1920×1080 pixels). Flexibility degree of such a screen, i.e., maximum permissible bend radius, is only 7.5 mm, and this despite the fact that the panel thickness is only 0.1 mm. It is based on FlexUPD technology developed within the ITRI walls allowing, among others, conversion of the existed lines for production of glass OLED panels to lines for production of flexible panels on the basis of polyimide polymer group with minimum expense.

New Semiconductor Energy Laboratory (SEL), Advanced Film Device (AFD) and Nokia displays that can bend double or event triple may also be used. Their resolution is 1280× 720 pixels, and number of pixels per inch is 249 ppi.

Regardless of the production technology, flexible displays have one important property, that is capability to bend under the impact of external load, and take the curved shape. If movement of a person wearing a jacket, on the back of which a flexible display is placed, is considered to be the external force acting on the flexible display, then the latter will bend in relation to the point or the line of external force application and take the form of the surface, on which it is fastened. This makes it possible to exclude the display breakup due to external forces and to increase operational durability not only of multimedia device, but of the user wearable device for video information and advertising material demonstration in general.

Use of the pocket on the front side of the personal item, which can be closed and whose front wall is made of transparent material, makes it possible to put the display in and out from the pocket, if necessary, for example, for washing or cleaning of the jacket or backpack. Modern displays designed as flexible film OLED panel of polymeric material are manufactured in the form of separate item (with or without the controller) and represented by a separate module that can be replaced in multimedia device. Such a pocket ensures effective protection against external medium (dust, moisture, dirt). The fact that the pocket wall is transparent, i.e., capable of passing the image or through which the image can be observed, allows demonstration of video material not putting the display out of the pocket.

Also according to the present invention, the new network system for distribution of information material to demonstration device carriers of this material is considered. This system is based on the fact that lately, for example, backpacks, school rucksacks or suitcases equipped with the display arranged on the front side became very popular. Wearing a backpack is a modern popular trend for young people, who use this backpack not only as a mean to carry personal items (virtually everywhere, the classic bag or briefcase is being replaced with a backpack in order to free the hands used to operate the phone, tablet computer or similar computerized device), but as a means of expression of their own mood or drawing of attention or attraction of like-minded persons by means of demonstration of some images or emoticons. Moreover, the image may be selected from a wide range of pictures provided in the Internet in the mode of public access and downloading, or such picture may be prepared by the user himself/herself (for example, PIX, US backpacks).

Regardless of the wearable item type (bag, backpack or suitcase or attaché case or element of clothes), either the flatbed displays are attached in the special pockets so that the display is oriented outward are used or LED lamps forming a matrix functioning as a display are built in the wearable item wall. As for the electronic internal components, all solutions are basically similar A pocket or sockets for placement of a battery and a processor unit with BLUETOOTH-receiver ensuring wireless communication between a mobile phone (smartphone, tablet computer, etc.) and a processor unit are provided in the wearable item itself. At the same time, special application allowing transmission of an image to a processor unit for displaying thereof is installed in a mobile phone (smartphone, tablet computer, etc.). The application allows copying of images from the Internet, creation of personal images, reception of images from the others and dynamic change of image while being demonstrated.

The people wearing such backpacks or bags or suitcases equipped with displays are related to the category of youth, students (or pupils), who didn't get a full-time job yet, i.e., related to the category of people constantly moving and traveling in the public crowd flow, are considered together with their backpacks or bags for displays (for example) as a primary element in the network advertising system and potential participants thereof with the devices worn by these users for video information and advertising material demonstration.

The proposed system is disclosed using the example of backpack usage.

This backpack 1 (FIG. 1) made of soft materials with or without a rigid framework on outer wall 2 (not turned towards the user's back) has, for example, a pocket, which can be closed and the front wall of which is made of transparent material. The display 3 of a multimedia device is inserted or fastened in this pocket with its main components placed inside the backpack in separate compartments (sections) or general compartment (section). The display 3 is electrically connected with the processor unit 4 placed inside the personal item and connected to the power unit 5. The processor unit 4 may be designed as a microprocessor board represented by single-chip BLUETOOTH controller with integrated processor functioning as a processor and signal reception unit in the wireless communication mode with mobile communication device 8 (for example, smartphone or tablet computer or any other portable computerized communication device) that is basically an information input/output device.

Microprocessor BLUETOOTH module means, for example, CC2540 BLUETOOTH chip which is a single-chip BLUETOOTH controller with a built-in processor serving as a processor and signal transmission unit. Or, for example, AT76C551 which is a single-chip controller designed to arrange high-speed short distance data transmission through a radio channel within permitted ISM radio frequency band. AT76C551 comprises a radio frequency processor. This processor performs all processing of digital stream including modulation and demodulation according to BLUETOOTH standard. The device controls the transceiver and pre-determined voice codec. AT76C551 comprises ARM7TDMI microprocessor core that supports operation with external and internal storage through the microprocessor interface.

A portable lithium-ion battery may be used as a power unit. Multimedia device has the "Start" button for connection of power supply. Processor unit and BLUETOOTH unit may be not joined on one board, but presented in the form of separate units. Flowchart of such multimedia device is given in FIG. 2. Modern element base of electric components allows making these elements having miniature design, wherein their placement on the inner side of the jacket or rear side of the outer wall of the backpack will not create any inconveniences.

Thus, a multi-purpose moving unit, such as a carrier of advertising or other information, is the user wearable device for video information and advertising material demonstration designed as a personal item worn by the user equipped with multimedia device comprising the display placed on the front wall of the personal item and electrically connected with the processor unit together with the power unit placed inside the personal unit and configured for connection to external source of video information and advertising material provision. Basically, the user wearable device for video information and advertising material demonstration is a terminal of mobile type with preset movement route and possible stops and social environment, where the movement takes place. The carrier of advertising or other information on the movement route moves among a large number of people. The number of people passed by the carriers increases exponentially together with the number of carriers of advertising or other information.

An attribute of the claimed system is also the fact that usage of the mobile communication device 6 (for example, smartphone or tablet computer or any other portable computerized communication device) configured for signal transmission in the wireless communication mode to the multimedia device processor unit equipped with the signal reception unit. Modern pocket and portable communication devices like cellphones, smartphones, etc., are the accessories constantly carried by people having BLUETOOTH controller for a short-distance connection, a telephone number and a current account number linked to this number. Moreover, typically applications of such communication devices provided with a possibility to use GSM module 9 with support of SIM function for identification of own location on the map or for setting of information on the movement route. Similarly, if a cellphone includes function of own location identification on the map (city plan, etc.), then this location may also be identified by the external control devices (identification by the phone number).

The hardware GSM module of a cellphone, as well as any other mobile device with SIM function support, operates in the continuous searching mode of the strongest and the most stable signal source. In case of subscriber's location change, the mobile device thereof connects to the nearest cell tower allowing provision of the most stable and uninterruptible connection. Mobile device locator PLNET will identify the phone location with the accuracy of several meters. It is only necessary to specify a subscriber number and activate search function.

Different mobile operators provide services, usually called "Mobile Locator", that allow identification and tracking of a person's location. To do this, it is necessary to connect to the service, select "Find Subscriber" in the menu, enter his/her cellphone, take the phone number of this person and confirm his\her consent. Then it will be fully functional. Sometimes it is necessary to send SMS with the phone and the phone user's name. When the user confirms this action, SMS with the person's location will be received.

The system also comprises server 10 of the processing center of the operator or the organization providing video information and advertising material for demonstration thereof on the display of the user wearable demonstration device. This server 10 comprises a base with advertising or other video material provided by the interested party (advertiser organization) in order to promote its goods or services. The operator or the organization providing video information and advertising material receives the material to be advertised or distributed and payment for service implementation, part of which accumulates on separate account 11 on the server 10 and is used as reward for the performed work for the carriers of demonstration devices of this material.

Server 10 of the processing center for provision of video information and advertising material includes a personal registration function of the user of wearable device for video information and advertising material demonstration, phone number of his/her mobile communication device and number of the user's current account with assignment of unique identification number for access to the server via menu 12 for entering, for example, the processing center website. After registration, the user, i.e., a person having a wearable item with display or multimedia device, can connect to information material traffic via application on his/her mobile communication device using this identification number.

When performing a connection, the user enters his/her identification number, indicates that the hardware GSM module is activated and gives his/her consent to identify his/her location (by receiving SMS). After permission for location identification is received, the processing server provides the menu with modes and conditions, within which the advertising or other material shall be demonstrated. For example, there are three variants of such modes:
mode of continuous movement of the user;
mode of movement of the user with short-term stops;
mode of stationary position.

Moreover, the user indicates time, within which he/she will demonstrate the received material on his/her display.

The processing center confirms and corrects, if necessary, the selected material demonstration conditions, provided that there is function of the user location identification, and sends the content to the application on the user's communication device in the remote communication mode. When this content is downloaded, the processing center server receives a signal of completion of file downloading and a signal to start displaying.

Server 10 is configured for implementation of the user's location control function (the user's movement control unit 13) or his/her movement by the phone number of his/her mobile communication device. When the material displaying time is over, price of the performed service is calculated (in the server calculation block 12) and reward is transferred to the user's current account or phone number linked to this account.

Communication of the server with the mobile communication device and vice versa is performed either by using satellite 14 or base station 15 complying with modern network systems for remote communication provision. Since any mobile phone is always linked to the nearest base station, the processing center has full capability to control movement of the carrier of video information and advertising material demonstration device and fulfillment of conditions by the latter. Similarly, the information about other people near the user is available to the mobile service provider either from the phones' geolocation data or from cell tower logs, and advertising shown on the display 3 can be targeted based on knowledge of the people surrounding the user.

Taking into account the current trends in the field of mobile application distribution, the server may put its application in on-line store and advertise it with possibility of downloading from different websites. When downloading the application, a user page like "My Profile" is created on the official site of the processing center (after the user is officially registered and received personal identification number) saving the user's history and showing advertising blocks that may be used for demonstration and demonstration condition thereof. Moreover, website page like "My Profile" may be entered not only from the mobile phone, but from, for example, desktop computer in order to create a content to be demonstrated on the screen of backpack or bag.

Screen on the backpack may display not only one full image or video (advertisement), but also several types of advertisement in separate windows on the general field of the display. Running letters may be used additionally to the material being demonstrated.

INDUSTRIAL APPLICABILITY

The present invention in relation to embodiment of the device is industrially applicable and allows increase of operational reliability during demonstration of full dynamic video/color graphics on the surfaces of personal items without stable space form. In this case, size of the display screen may vary. The device itself does not pose any threat to health of the carrier of video information and advertising material demonstration device. Moreover, efficiency is obtained by the fact that the carriers of devices for demonstration of this material are constantly on the moving crowd flow and at the same time are moving in this flow by themselves.

Having thus described a preferred embodiment, it should be apparent to those skilled in the art that certain advantages of the described method and system have been achieved. It should also be appreciated that various modifications, adaptations, and alternative embodiments thereof may be made within the scope and spirit of the present invention. The invention is further defined by the following claims.

The invention claimed is:
1. A user wearable device for video demonstration, comprising:
a user wearable personal item, the item including a multimedia device comprising
(i) a display,
(ii) a processor unit,
(iii) a power supply,
(iv) a motion sensor, and
(v) a geolocation module,
wherein the display is placed on a front wall of the personal item and electrically connected to the processor unit,
wherein the processor unit is inside the wearable personal item and connected to the power supply,
wherein the processor unit is a single-chip BLUETOOTH controller with an integrated processor for signal reception in a wireless communication mode of a mobile communication device,
wherein the display is a flexible film OLED panel placed in a flexible pocket on the front side of the user wearable personal item, which is closable and whose front wall is made of a flexible transparent material, and
wherein the multimedia unit, after being configured and registered with a server by the user through an application running on the processor unit, receives multimedia advertisements from the server that are based on location derived from the geolocation unit and based on movement detection by the motion sensor, and displays the advertisements based on the location and the movement, and also based on identities of other mobile network users nearby, and wherein the registration is used to distribute financial rewards to the user for displaying the advertising, and wherein the user is rewarded for showing the advertisements on the display by giving the user discounts on the advertised products or services through the application.

2. The user wearable device of claim 1, wherein the display is an LCD panel with an HDMI controller board for flexible OLED displays.

3. The device of claim 1, wherein the display is an LED film.

4. The device of claim 1, wherein the user wearable personal item is a garment, a shoe, a bag, a backpack or a suitcase.

5. A system for distribution of content, comprising
a processing center server that provides the content;
a plurality of user wearable personal items for demonstration of the content;
a mobile communication device for each user wearable device;
a software application;
wherein each user wearable personal item includes a multimedia device comprising a flexible display, placed inside a flexible pocket with a transparent front wall, of the user wearable personal item and electrically connected to a processor unit a power unit that are inside the flexible pocket of the user wearable personal item and configured for connection to an external source of content,
wherein the mobile communication device is configured to receive the content from the server for demonstration on the display of the user wearable demonstration device,
wherein each mobile communication device has hardware GSM module supporting SIM function, and
wherein the multimedia unit, after being configured and registered with the processing center server by the user through an application running on the processor unit, receives multimedia advertisements from the processing center server that are based on geolocation and user movement, and displays the advertisements based on the geolocation, the movement and also based on identities of other mobile network users nearby, and
wherein the processing center server is configured to:
register the user of wearable device, a telephone number of the mobile communication device and a current account number of the user;
assign a unique identification number for access to the server;
connect to the content through the software application after setting a time of demonstration of the content in a mode of continuous movement of the user or in a mode of movement of the user with short-term stops or in a mode of astatic stationary position;
control location of the user and movement of the user by tracking the mobile communication device; and
transfer a reward to the current account number or the telephone number linked to this account upon expiration of a user-specified demonstration time of the content.

6. The system of claim 5, wherein the mobile communication device is a smartphone, an i-pad or a smart watch.

7. The system of claim 5, wherein the user wearable personal item is a garment, a shoe, a bag, a backpack or a suitcase.

8. A system for distribution of information to demonstration device carriers, comprising:
a plurality of user wearable devices for display of video information, each user wearable device including
a user wearable personal item with a multimedia device comprising an OLED display,
the OLED display placed inside a flexible pocket of the personal item that has a transparent a front wall and electrically connected to the processor board and a power unit that are inside the wearable personal item,
the OLED display configured for connection to an external source of the video information,
the external source also providing advertising materials,
wherein, the multimedia device has a mobile interface for receiving the video information and advertising materials,
wherein the mobile interface is configured for signal reception and transmission in the wireless communication mode through the processor board,
wherein the multimedia device, after being configured and registered with a server by the user through an application running on the processor unit, receives video information and advertising materials from the processing center server that are based on the user's geolocation and movement, and displays the advertisements based on the geolocation, the movement and also based on identities of other mobile network users nearby,
the processor board configured for reception of signals from the server with the video information and advertising materials for demonstration on the display,
wherein each mobile communication device includes a hardware GSM module supporting SIM function,
wherein the server is also configured for registration of the user wearable devices, including a telephone number of the corresponding mobile communication device and a current account number of the user, with assignment of a unique identification number for access to the server,
wherein the mobile communication device is executing an application for display of the video information and advertising materials, based on demonstration time received from the server and detection of continuous movement of the user or movement of the user with short-term stops or a stationary position of the user,
wherein the server is configured for controlling location of the user and movement of the user by detecting a location of the mobile communication device, and
wherein the server transfers financial rewards to the user's current account upon the video information and advertising materials being displayed for a specified demonstration time on the OLED display.

9. The system of claim 8, wherein the mobile communication device is a smartphone, an i-pad or a smart watch.

10. The system of claim 8, wherein the user wearable personal item is a garment, a shoe, a bag, a backpack or a suitcase.

* * * * *